United States Patent
Manning

4,071,752
Jan. 31, 1978

[54] SELF-SYNCHRONIZING OPTICAL IMAGING SYSTEM

[75] Inventor: Richard J. Manning, Altamonte Springs, Fla.

[73] Assignee: International Laser Systems, Inc., Orlando, Fla.

[21] Appl. No.: 684,249

[22] Filed: May 7, 1976

[51] Int. Cl.$^2$ ............................................. H01J 31/50
[52] U.S. Cl. ............................ 250/213 VT; 250/216; 350/96 B
[58] Field of Search ............ 250/213 R, 213 VT, 199, 250/216, 227, 207; 350/96 B, 96 C; 313/103 R, 104

[56] References Cited
U.S. PATENT DOCUMENTS

| | | | |
|---|---|---|---|
| 3,360,324 | 12/1967 | Hora | 250/199 |
| 3,631,252 | 12/1971 | Gebel | 250/213 VT |
| 3,652,154 | 3/1972 | Gebel | 250/213 VT |
| 3,849,604 | 11/1974 | Benes et al. | 250/199 |
| 3,903,451 | 9/1975 | Hall et al. | 250/213 VT |

*Primary Examiner*—David C. Nelms
*Attorney, Agent, or Firm*—Duckworth, Hobby & Allen

[57] ABSTRACT

A self-synchronizing optical radiation imaging device and optical delay circuit is provided with optics for receiving optical radiation and directing the radiation to an optical image delay system for delaying the optical radiation for a predetermined length of time. An optical radiation energy detector detects when optical radiation of a predetermined energy level has been received and actuates a gating circuit, which in turn, turns an image intensifier either on or off, depending upon the embodiment used, to coincide with the reception of the delayed signal by the image intensifier and to maintain the image intensifier on or off during the period that the receiving optics is receiving optical radiation of at least the predetermined level. An optical delay system is provided in which a bundle of incoherent fiber-optics of predetermined length are mounted to receive a signal at one end and a reflecting mirror is mounted to the opposite end for reflecting the received signal back through the bundle of fiber-optics.

15 Claims, 3 Drawing Figures

SELF-SYNCHRONIZING OPTICAL IMAGING SYSTEM

BACKGROUND OF THE INVENTION

The present invention relates to a system for activating or deactivating an image intensifier tube, or the like, responsive to the reception of optical radiation of increased intensity for the length of time that the optical radiation of increase intensity is being received and to an optical delay circuit for delaying optical radiation of increase intensity until an image intensifier tube is turned on or off.

Image intensifiers have been commonly used in the past for a variety of purposes such as night surveillance by police or by others observing the habits of nocturnal animals or the like. However, such devices can also be utilized in a variety of low light situations, such as when televising ball games, or the like, at night or in low light situations to improve the received signal. One problem with this latter use is the tendency of the image intensifier to be overloaded, thereby damaging the intensifier tube and other circuitry when a bright light is received, such as from a nearby flash blub going off.

The present invention in one of its embodiments is directed toward a system which can momentarily turn an image intensifier or similar circuit on or off momentarily responsive to the reception of optical radiation of increased intensity so as to prevent damage to the image intensifier and related circuitry. In order to accomplish this, a delay circuit is needed to hold the optical signal of increased radiation momentarily while the image intensifier is turned on or turned off. The image intensifier tube could be turned on to record the actual scene when the flash of light goes off in the one embodiment.

Typical prior art patents include U.S. Pat. No. 3,462,603 for a variable delay and beam splitter and U.S. Pat. No. 3,801,819 for fiber-optics in a transmission line used in a laser communication system. In U.S. Pat. No. 3,851,167 a combination image intensifier utilizing a fiber-optics transmission line is provided while in U.S. Pat. No. 3,833,805 an image intensifier is utilized in the laser system. Other patents include U.S. Pat. No. 3,604,936; U.S. Pat. No. 7,733,129; and U.S. Pat. No. 3,877,157.

The present system advantageously allows image intensifier tubes to be utilized in systems in which rapidly changing optically radiation might be received as well as in systems intended to record only short burst of optical radiation of increased intensity.

SUMMARY OF THE INVENTION

A self-synchronizing optical radiation imaging device is provided having optics for receiving optical radiation and an optical image delay system for delaying at least a portion of the optical radiation received by the receiving optics. An optical radiation energy detector is provided for detecting the reception of optical radiation above a predetermined level and actuating a high voltage gate responsive to and for the duration of the received optical radiation of increased level. The high voltage gate operates an image intensifier in synchronization with the reception of the delayed optical image so that the entire optical image during the duration of the reception may be recorded. The delayed optical signal is directed to the intensifier following its delay. Alternatively, the high voltage gating circuit can be turned off momentarily responsive to the optical radiation of increased energy level for its duration to prevent damage to the image intensifier tube. The optical radiation delay system has a bundle of incoherent fiberoptics of a predetermined length with an input for receiving optical signals at one end and a reflective surface mounted at the opposite end for reflecting signals passing through the incoherent fiber-optics back through the fiber-optics in the same order as received so that a signal can be delayed for twice the length of the fiber-optics times the refractive index of the fiber-optic fibers.

BRIEF DESCRIPTION OF THE DRAWINGS

Other objects, features and advantages of the present invention will be apparent from the written description and drawings in which.

DESCRIPTION OF THE PREFERRED EMBODIMENTS

Figure 1:
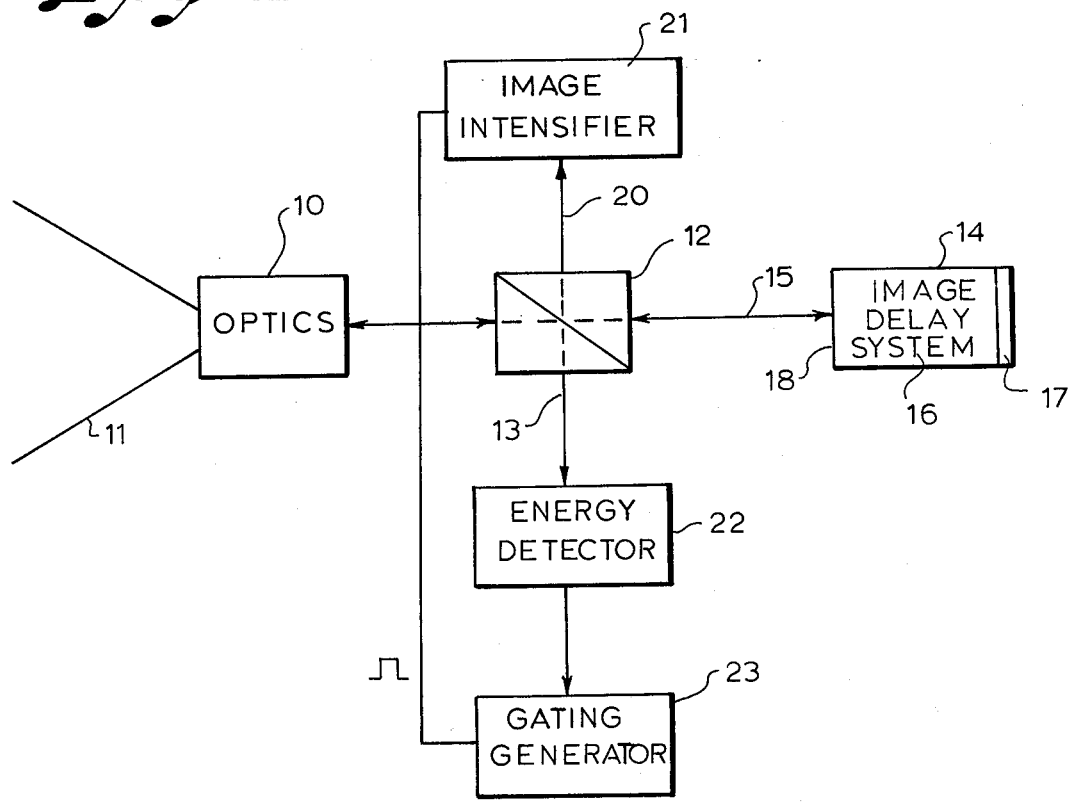
FIG. 1 is a block diagram of a self-synchronizing optical radiation imaging device in accordance with the present invention.

Referring now to FIG. 1, receiving optics 10 may receive optical radiation from a scene covered by the angle 11. Optics 10 may be any standard lens for viewing a scene and directs the received scene through a beam splitter 12 where a portion of the energy is directed in the direction of arrow 13 while a portion of the energy is directed through the beam splitter to the delay system 14 as illustrated by the line 15. The delay system includes a bundle of incoherent fiber-optics indicated generally at 15 which fiber-optics are not required to be in precise alignment in relation to all of the other fibers in order to produce the same image at the opposite end. This reduces the cost of the incoherent fiber-optics substantially over the cost of coherent fiber-optics for producing an exact reproduction of the signal. In the present system a mirror or other reflective surface 17 is mounted to one end of the bundle of fiber-optics 16 for reflecting that portion of the image received by each fiber directed back through the fiber and out the input 18 to the incoherent fiber bundle 16 and directly back towards the beam splitter 12 as illustrated by the double direction of the arrow on the line 15. The passage of the optical radiation through the delay system 14 delays the signal by the length of the fiber-optics 16 times the refractive index of the fiber-optics times two since the radiation is reflected back through the fiber-optics 16. Thus, if the fiber-optics were 12½ feet long and the refractive index of the fiberoptics was 1.6 the distance traveled through the fiber-optics would be 25 feet times the refractive index of 1.6 or 40 nano seconds for a 40 nano seconds delay. It should of course be clear that this delay can be varied by changing the length of the fiber-optics 16. The signal leaving the input-output 18 of the delay system 14 is again directed towards the beam splitter 12 where a portion of the signal is directed by the line 20 into the image intensifier 21 and a portion of the signal is directed through to the optics 10. It will accordingly be seen that the signal 20 arriving at the image intensifier tube has been delayed by a predetermined amount of time such as 40 nano seconds in the above example. This delay allows a sufficient time for the remainder of the circuit to turn the image intensifier on or off as desired. The optical energy reflected by the beam splitter 12 upon the original receipt of the signal of the optics 10 is directed along the path 13 to the energy detector 22 which energy detector detects an optical signal only when it exceeds a certain threshold level and stays turned on only so long as the energy exceeds that threshold level. However, turning the energy detector 22 on takes a short period of time such, as 20 nano seconds. The energy detector in turn actuates a high voltage gating generator 23 which either directs a high voltage for operating the image intensifier tube 21 to the image intensifier tube 21 or shuts off a continous high voltage supply operating the image intensifier 21 during the duration of the operation of the energy detector 22. The actuation of the gating generator, however, to turn on the image intensifier takes a short period of time such as 20 nano seconds. Thus, the delay from the energy delay from the energy detector and gating generator to turn on the image intensifier 21 might take approximately 40 nano seconds upon the receipt by the optics 10 of optical radiation of increased intensity so that the delay system 14 may also be calculated for the same amount of time so that the image intensifier 21 will be turned on upon the arrival of the optical energy or scene from the optics 10 arriving at the image intensifier 21.

Figure 2:
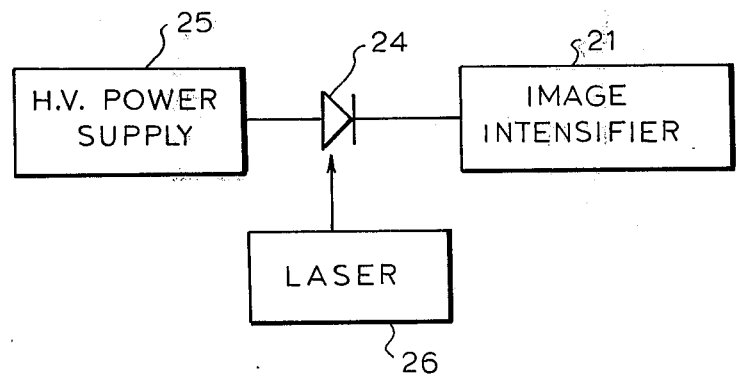
FIG. 2 is a block diagram of the gating generator of FIG. 1.

FIG. 2 illustrates a fast acting high voltage gating generator for use in the block 23 of FIG. 1. An avalanche photo-diode 24 is connected from a high voltage power supply 25 on one side and to the image intensifier tube 21 on the other. The high voltage power supply is prevented (in this embodiment) from operating the image intensifier tube until turned on and is actuated by gallium arsenide laser 26 which has been turned on by the energy detector 22. Thus, a fast operating gating generator is provided for a high voltage power supply. It will of course be realized at this point that the system works in reverse to prevent saturation and destruction of the image intensifier tube by cutting off when very bright flashes of light are received. This occurs by having the image intensifier tube on continuously until optical radiation of a predetermined increased level are received by the energy detector 22 which thus operates the gating generator to turn off the image intensifier at the exact time of the receipt of the delayed scene arriving at the energy intensifier and for the duration of the increased level of optical radiation. It will of course be clear that the received signal could be visible light, but the term optical radiation includes infrared, ultraviolet, and any similar optical radiation that might be desired to be used with such as system.

Figure 3:
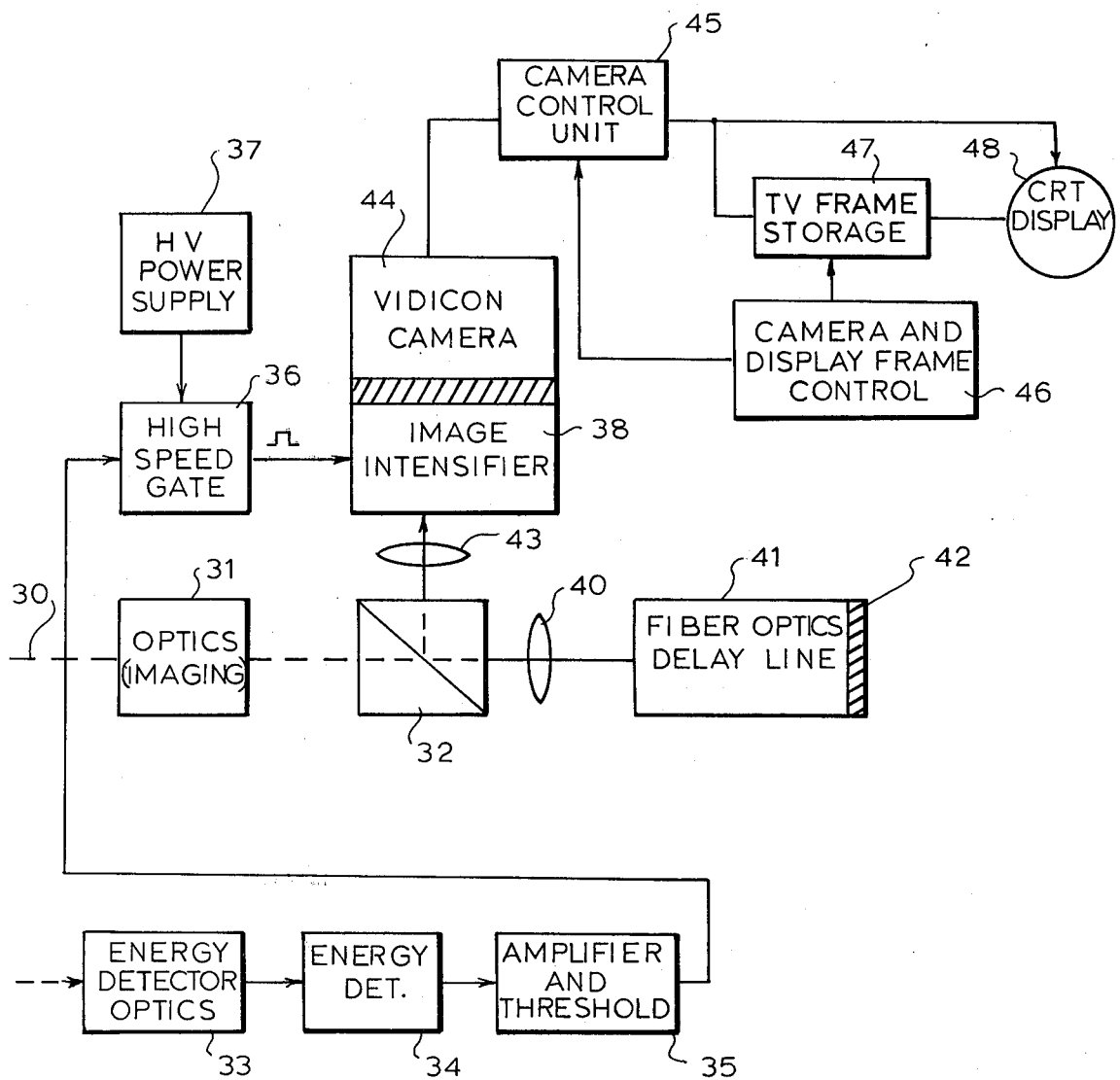
FIG. 3 is a block diagram of an alternate embodiment of the self-synchronizing optical radiation imaging device in FIG. 1.

FIG. 3 illustrates a similar but modified embodiment in which the optical scene 30 is received by the imaging optics 31 and directed to a beam splitter 32 while the same signal 30 is being received by the energy detected optics 33 to operate the energy detector 34 which includes an amplifier and threshold detector 35 which in turn operates the high speed gating circuit 36 which delivers, or cuts off, the high voltage power supply 37 to the image intensifier 38. The beam splitter 32 directs the signal through relay optics 40 to the fiber-optic delay line 41 which includes the incoherent fiber-optic bundle mounted adjacent the mirror 42 where the signal is reflected by the mirror 42 to produce a delay in the image received by the optics 31. This signal is directed back through the relay optics 40 against the beam splitter 32 and through the relay optics 43 to the image intensifier which is simultaneously been turned on by the high speed gate 36. In this case the image intensifier is connected to a vidicon camera 44 for recording the received image from the optics 31 and optical relay 41. The vidicon camera 44 may if desired be connected to a camera control unit 45 which in turn is connected to a camera and display frame control 46 and to a TV frame storage 47 which is connected to CRT display tube 48. However, it will be clear that the image intensifier can be interconnected to a still camera for recording on film or to any other systems as desired.

It should be clear at this point that a self-synchronizing optical radiation imaging device has been provided which uses an optical image delay line to permit time to develop an electronic gate pulse used to turn on the image intensifier tube for the image detection. It should, however, be clear that this invention is not intended to be limited to the particular forms disclosed herein which are to be illustrative rather than restrictive.

I claim:

1. A self-synchronizing optical radiation imaging device comprising in combination:
    optical receiving means for receiving optical radiation;
    optical image delay means for delaying at least a portion of the optical radiation received by the optical receiving means;
    optical radiation detection means for detecting optical radiation received by said receiving means;
    means to direct the optical radiation received by said optical receiving means to said optical image delay means and to said optical detection means;
    gating means coupled to said optical radiation detecting means for actuating a high voltage gating signal responsive to said optical receiving means receiving a predetermined level of optical radiation;
    image intensifier means for intensifying optical radiation received by said optical receiving means; and
    means to direct the delayed optical radiation from said optical delay means to said image intensifier means after a predetermined delay whereby said gating means activites said image intensifier means upon receiving optical radiation of a predetermined level in time to receive delayed optical radiation of a predetermined level for the duration of the predetermined level of said optical radiation.

2. The imaging device in accordance with claim 1 in which said optical image delay means includes a bundle of incoherent fiber-optics for delaying the optical radiation passing therethrough.

3. The imaging device in accordance with claim 2 in which said optical image delay means includes a reflecting surface mounted adjacent one end of said bundle of incoherent fiber-optics whereby the optical radiation passing therethrough is delayed by the reflection of said optical image back through said bundle of fiber-optics.

4. The imaging device in accordance with claim 3, in which said means to direct radiation to said optical image delay means and to said optical detection means includes a beam splitter which directs optical radiation to said optical image delay means and to said optical radiation detection means.

5. The imaging device in accordance with claim 4 in which said beam splitter directs optical radiation from said optical image delay means to said image intensifier means.

6. The imaging device in accordance with claim 1 in which said gating means includes an avalanche photo-diode actuated by a laser responsive to a signal from said optical radiation detection means to apply the said high voltage gating signal to said image intensifier.

7. The imaging device in accordance with claim 6 in which said gating means removes the high voltage signal to said image intensifier after a predetermined delay in response to said optical radiation detection means receiving a signal of a predetermined level.

8. The imaging device in accordance with claim 7 in which said imaging intensifier means is connected to a vidicon camera.

9. An optical radiation delay system comprising in combination:
   a bundle of incoherent fiber-optics of predetermined length;
   an input means to receive optical radiation in one end of said bundle of incoherent fiber-optics; and
   a reflective surface mounted to the other end of said fiber-optics for reflecting optical radiation back into said incoherent fiber-optics thereby delaying a signal passing in each direction through said fiber-optics.

10. The optical radiation delay system in accordance with claim 9 in which said input means includes at least one lens for directing an optical image onto said one end of said incoherent fiber-optics of predetermined length.

11. A self-synchronizing optical radiation device comprising in combination:
    imaging optics for receiving optical radiation;
    a bundle of incoherent fiber-optics of predetermined length mounted for receiving optical radiation received by said imaging optics in one end of said bundle of incoherent fiber-optics;
    a mirrored surface mounted to the other end of said bundle of incoherent fiber-optics for reflecting optical radiation passing through said bundle of fiber-optics;
    an image recording means mounted to receive a signal from said bundle of incoherent fiber-optics; and
    optical relay means for directing an image from said bundle of incoherent fiber-optics to said image recording means whereby an optical image is delayed prior to being received by a recording means.

12. The self-synchronizing optical radiation device in accordance with claim 11 in which optical radiation being received by said imaging optics is also received by an energy detection and gating means for actuating said image recording means.

13. The self-synchronizing optical radiation device in accordance with claim 12 in which said energy detection and gating means actuates a gating generator to turn said image recording means on to receive a delayed signal from said bundle of incoherent fiber-optics.

14. The self-synchronizing optical radiation device in accordance with claim 12 in which said energy detection and gating means turns said image recording means off responsive to receiving optical radiation of a predetermined energy level for the duration of said optical radiation exceeding said predetermined energy level.

15. The self-synchronizing optical radiation device in accordance with claim 13 in which said energy detection and gating means turns said image recording means on responsive to receiving optical radiation of a predetermined energy level for the duration of said optical radiation exceeding said predetermined energy level.

* * * * *